Sept. 29, 1931.    G. C. CUSACK    1,825,054
REFRIGERATIVE APPARATUS
Filed Aug. 9, 1926
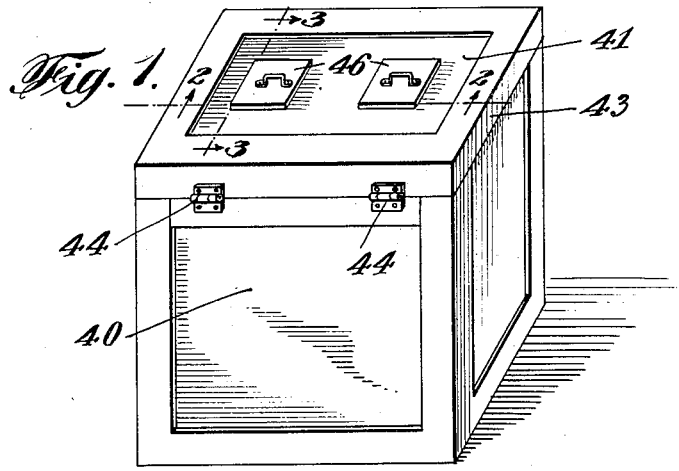
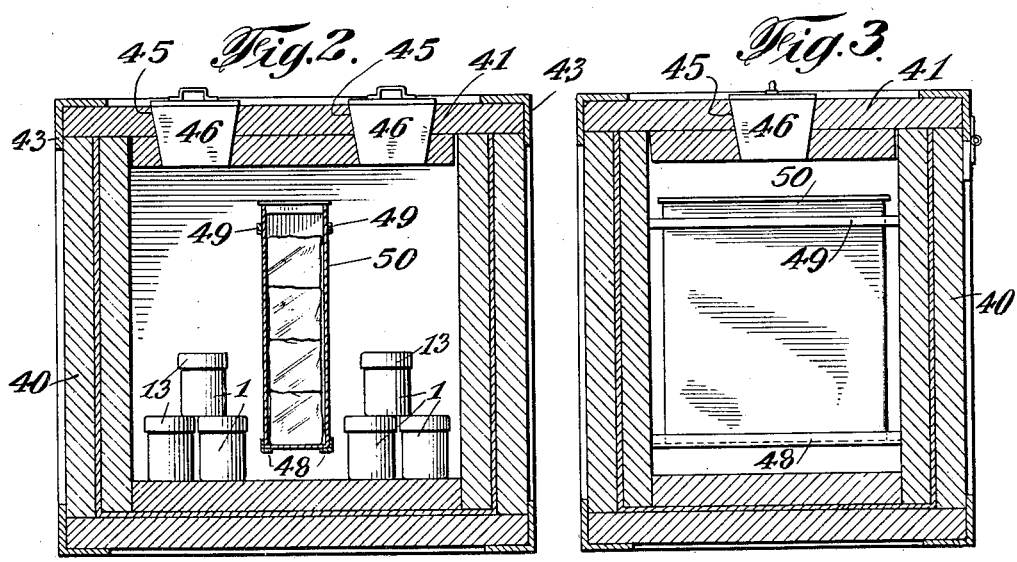
Inventor
George C. Cusack
By his Attorney

UNITED STATES PATENT OFFICE

GEORGE C. CUSACK, OF WEST NEW YORK, NEW JERSEY, ASSIGNOR, BY MESNE ASSIGNMENTS, TO DRYICE EQUIPMENT CORPORATION, A CORPORATION OF DELAWARE

REFRIGERATIVE APPARATUS

Application filed August 9, 1926. Serial No. 128,075.

My present invention involves special applications of some of the general principles set forth in patents to Slate, such as No. 1,511,306, granted October 14, 1924, with reference to the use of frozen carbon dioxide, particularly in the form of dense blocks made either by direct freezing of the liquid carbon dioxide or by highly compressing carbon dioxide snow.

As explained in said patents, the carbon dioxide is much heavier than water and has a very low melting point, something like 112°–114° below zero Fahrenheit. When melted at pressures near atmospheric, it sublimates directly to a gas without any intermediate liquid state, hence, there is no liquid to wet things but, on the contrary, the gas being anhydrous, tends to dry up moisture. Moreover, the gas is far heavier than air so that it will displace air and, if the container is not too leaky, will completely exclude it. Such heavy, dry gas is a very efficient heat insulator, and for purposes of my present invention, such gas may be relied upon to furnish most of the insulation. Under proper conditions, this insulating effect plus the refrigerating effect due to latent heat absorbed in sublimating and sensible heat absorption by the resulting gas in warming up from such a low temperature, combine to make a given volume of solid carbon dioxide, ten to fifteen times as effective as the same volume of water ice.

All of the above qualities, particularly adapt the solid carbon dioxide for the specific purpose of my present invention, which particularly concerns distributing methods and means for the retail ice cream trade.

By my invention, I refrigerate and also insulate the frozen ice cream by surrounding the ice cream container with dry cold carbon dioxide gas, continuously supplied by evaporation from carbon dioxide.

The features of my invention will be more readily understood from the following description in connection with the accompanying drawings, in which Fig. 1 is a perspective view of a refrigerator adapted to superfreeze and or retain in frozen condition, the product adaptable to be used in a refrigerated transportation package;

Figs. 2 and 3 are vertical sections respectively on the lines 2—2 and 3—3, Fig. 1.

While superfreezing of the product may be accomplished by packing the same directly in solid carbon dioxide, I prefer for commercial purposes, a refrigerator-like device such as that shown in Figs. 1 to 3. In these figures there is a massive box, 40, the walls of which may be of balsa wood or any other approved insulating construction. The shape of the box may be an approximate cube so that the exterior surface area will be a minimum for the cubic contents of the box. The important feature is that the box is open only at the top. The top is closed by a massive cover, 41, having flanges 43, 43, fitting the box closely so that leakage of air will be prevented. Having the top of the box horizontal tends to prevent any but the warmest air or gas within the box from approaching said joint and obviates possibility of thermo-siphon circulation such as can occur when one edge of an opening is lower than another, so that cold air may flow out from the former and warm air suck in through the latter.

This cover is removable, being preferably mounted on hinges 44. The latter are used only when it is necessary to have access to the interior of the box for cleaning the same or for charging it with refrigerant. For ordinary use, the parcels, packages, cans or boxes of the ice cream or other product are inserted and removed by hand through openings 45, 45, which are normally closed by massive blocks 46, 46, of insulating material. In the present case, a number of ice cream containers 1 are shown stacked up on the floor.

The interior of the box is maintained at any desired low temperature by solid carbon dioxide, which, for superfreezing purposes, may be packed with the containers. In practice, however, almost equally low temperatures may be obtained with more uniformity and with greater commercial dependability by the arrangement shown wherein the refrigerant is contained in a tall metal can, 50, which is thin in one dimension, as shown in Fig. 2, and which is so large in the other dimension that it may nearly fill the refrigerated space as shown in Fig. 3. This metal container is preferably mounted on angle irons 48, extending across the interior, preferably some distance above the bottom, so as to give free circulation beneath the same. Cooperating crossbars, 49, afford side guides to hold the metal container 50 upright, yet permit slidable vertical removal thereof when the top of the box is opened.

The heat from the interior is absorbed through the thin metal walls of box 50, melting the carbon dioxide and evolving large volumes of cold carbon dioxide. If the box is water-tight, this will escape by spilling over the top and flowing down among the packages. By properly designing the capacity and surface area of the box, 50, the temperature of the interior may be retained at any desired temperature. If extreme cold is desired, additional blocks of carbon dioxide may be deposited in the box 40 or on the bottom of box 50 may be perforated so that there is a natural down circulation of cold gas escaping from the bottom and warmer air drawn in the top.

I claim:—

1. A refrigerator consisting of a box of insulating material and gas tight construction open only at the top and having its top opening horizontal, an insulating cover removably closing said top and provided with a plurality of relatively small hand holes therethrough, having insulating closures, and within said box a container of carbon dioxide, of great depth as compared with its thickness, means supporting it near but above the bottom of said box to afford circulation on all sides thereof and having its top spaced apart below the cover of the box and discharging the sublimated carbon dioxide gas at a level which is a substantial distance below said cover.

2. A refrigerator consisting of a box of insulating material and gas tight construction open only at the top and having its top opening horizontal, an insulating cover removably closing said top, having a plurality of spaced apart relatively small hand holes therethrough and closures for said holes, and within said box a relatively thin, flat, high container of solid carbon dioxide arranged like a partition between different parts of the box accessible through different hand holes but designed and supported so as to afford circulatory space for the gas therefrom above, below and on all sides thereof.

Signed at New York, in the county of New York, and State of New York this 7th day of August, A. D. 1926.

GEORGE C. CUSACK.